Jan. 31, 1967    M. J. TERHO    3,301,417
MECHANISM FOR MOVING FRONT WALL OF REFUSE
DISPOSAL VEHICLE, OR THE LIKE
Filed April 8, 1965    6 Sheets-Sheet 1

Inventor:
Mikko Jooseppi Terho
Burger, Ryan & Hicks

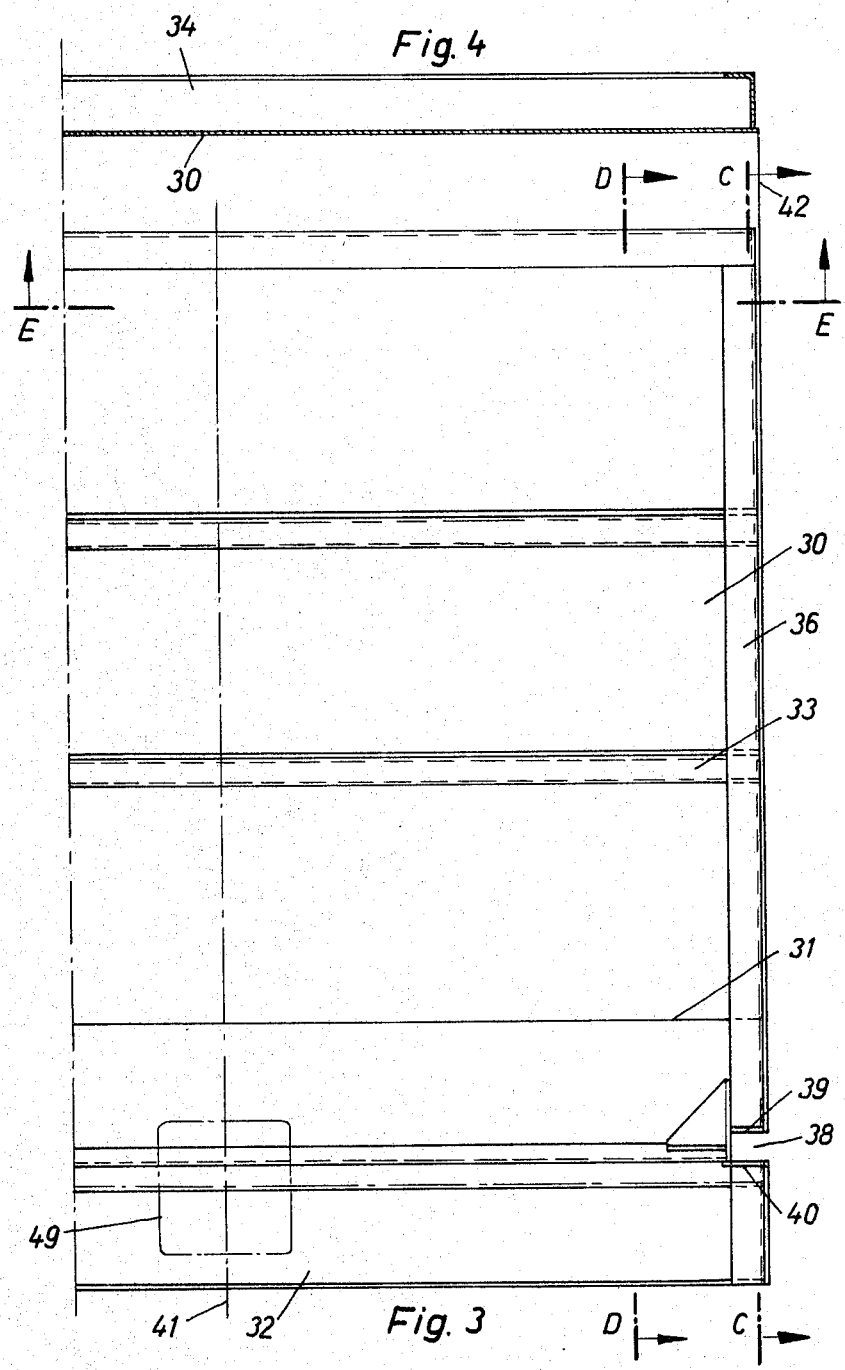

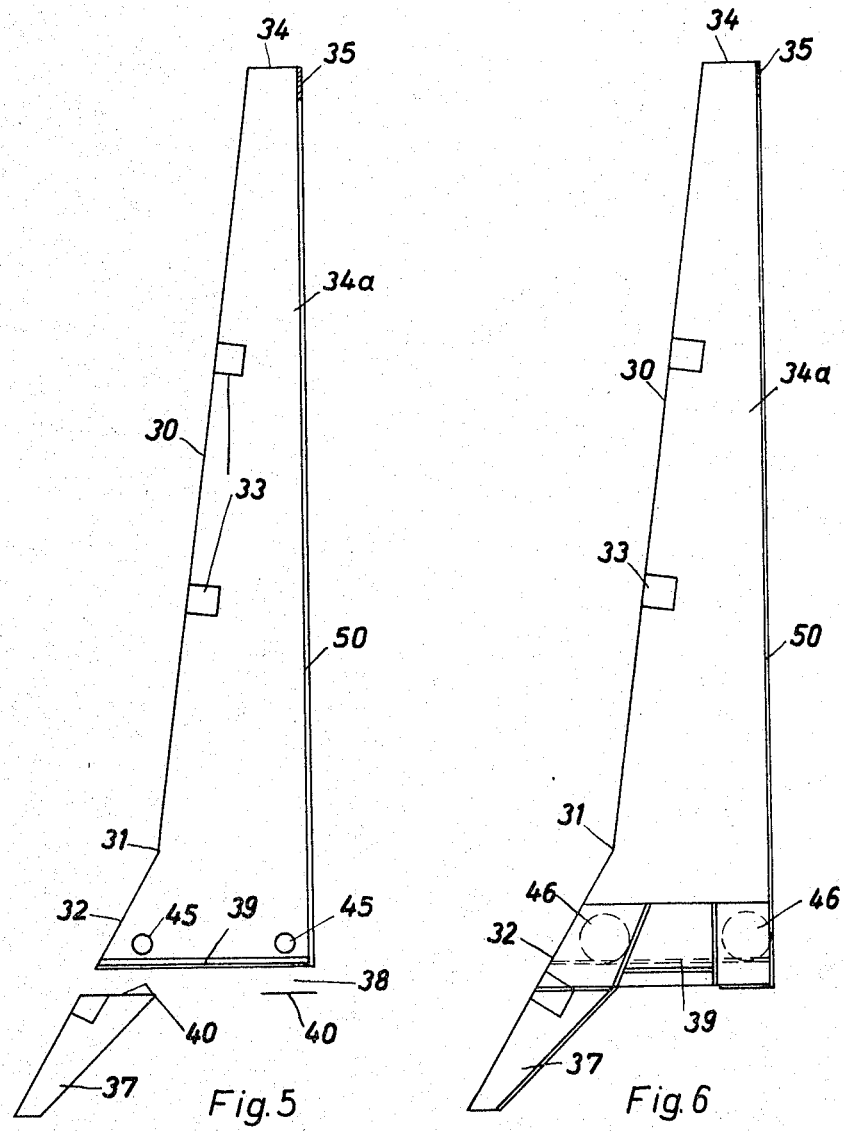

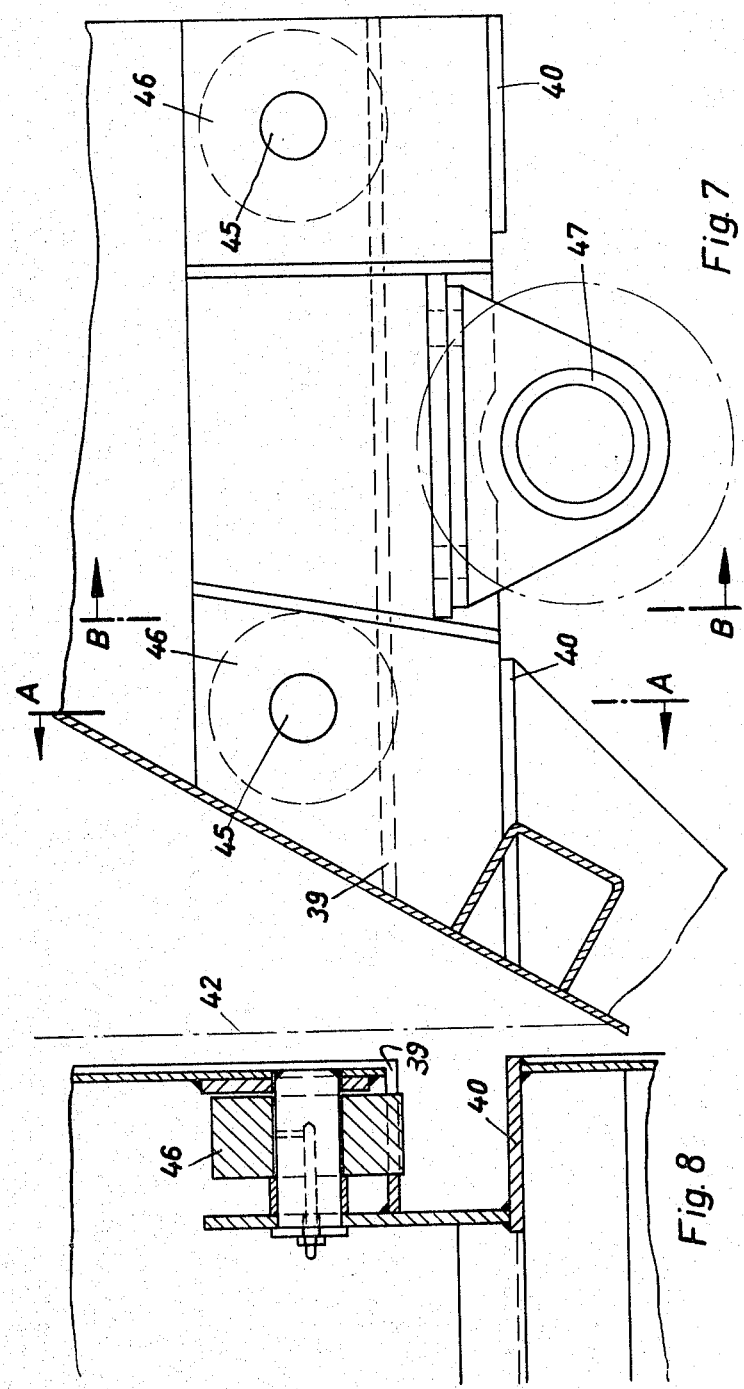

United States Patent Office 3,301,417
Patented Jan. 31, 1967

3,301,417
MECHANISM FOR MOVING FRONT WALL OF REFUSE DISPOSAL VEHICLE, OR THE LIKE
Mikko Jooseppi Terho, Autolava Oy, Raisio, Finland
Filed Apr. 8, 1965, Ser. No. 446,659
2 Claims. (Cl. 214—82)

Nowadays a more economic, faster and more hygienic way of removing refuse is aimed at. To this end endeavours are made to compress the rubbish compactly to a small space in the rubbish tank of the appropriate transport vehicle by means of special devices. Thus the efficiency of transport can be raised considerably over that of the ordinary open cargo vehicle. When loading is automatic a smaller number of men is required in the vehicle and the loading time is shorter. Except saving in costs this form of transportation has the advantage of being hygienic in that odours and the possibility of rubbish flying about is eliminated.

To this end the waste containers of motor vehicles for loading waste are provided with mobile front walls, which are moved vertically to the plane of the walls in the manner of a piston by means of arms of various types attached, in order to press the waste tight and to discharge it from the vehicle. However, such arms for moving the front wall require comparatively large space and are inconvenient for the operations of the motor vehicle.

The invention presented here seeks to eliminate these disadvantages. The characteristic features of the invention are presented in the patent claims.

One working example of the invention is illustrated below with reference to the enclosed drawings.

FIG. 3 presents the mobile inner front wall of the waste container, according to the invention, viewed from the rear or from the driver's cabin.

FIG. 4 presents a section taken on the line E—E in FIG. 3 viewed in the direction of the arrows, FIG. 5 a section taken on the line C—C, and FIG. 6 on the line D—D.

Figure 9:
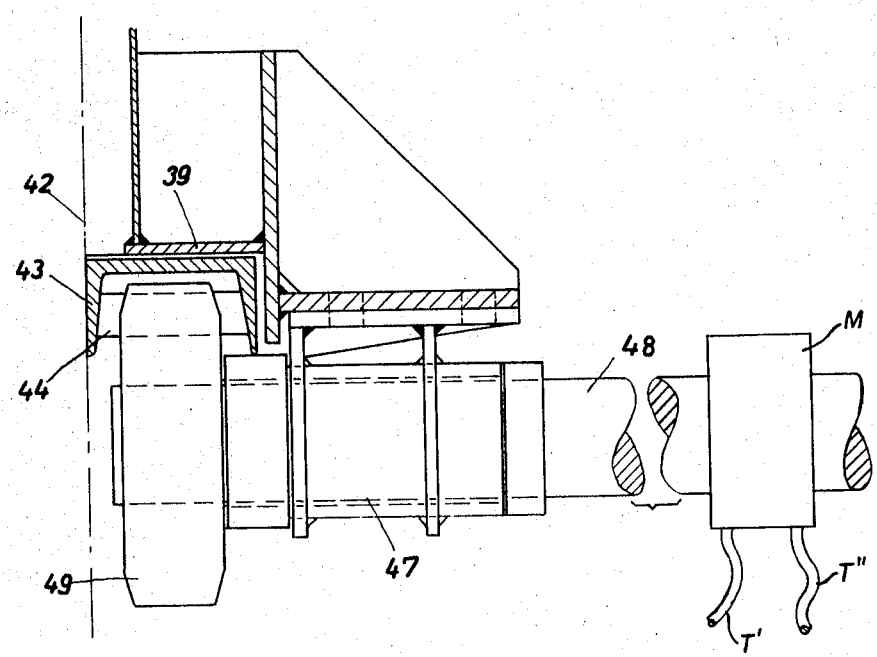

FIG. 7 presents on a larger scale a detail in FIG. 6, FIG. 8 a section taken on the line A—A in FIG. 7 viewed in the direction of the arrow, and FIG. 9 a section taken on the line B—B viewed in the direction of the arrow.

Figure 1:
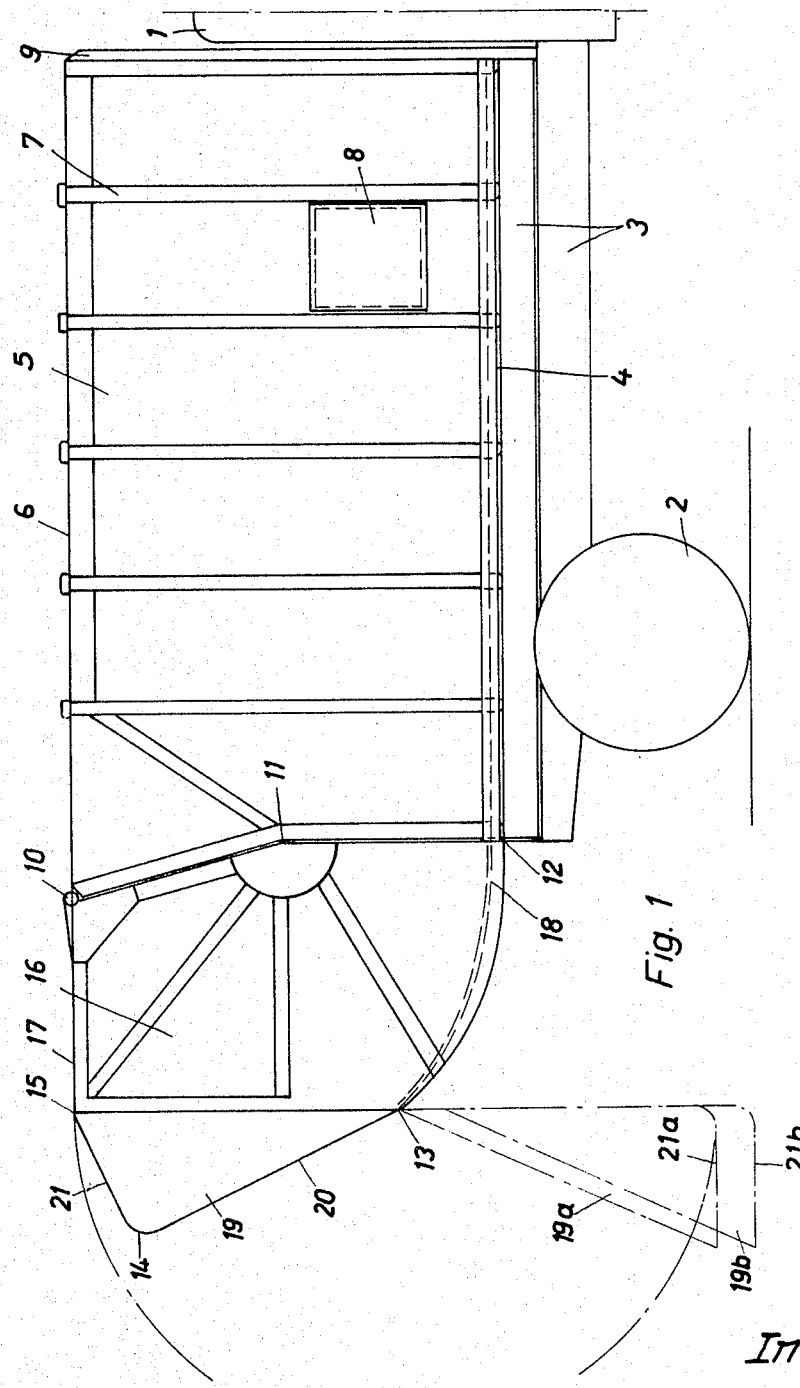
FIG. 1 is a side elevation of a transport vehicle for rubbish according to the invention.

In FIG. 1 the numeral 1 designates a section located close to the rear wall of the driver's cabin, 2 rear wheels, 3 side rails and frame bars. The rubbish tank built on the frame construction includes a bottom 4, side walls 5, and a roof 6, all smooth and plane inside and on the outside possibly reinforced with bars 7. The side walls may be provided with an opening 8 through which the operations inside of the tank can be watched by opening the cover. The front wall 9 is stationary, but inside of it there is another wall, not shown in the drawing, which is almost vertical and which can be moved horizontally inside of the tank in the manner of a piston, so that the tank can be emptied through its opened rear end and likewise the rubbish can be compressed inside of the tank if necessary.

Figure 2:
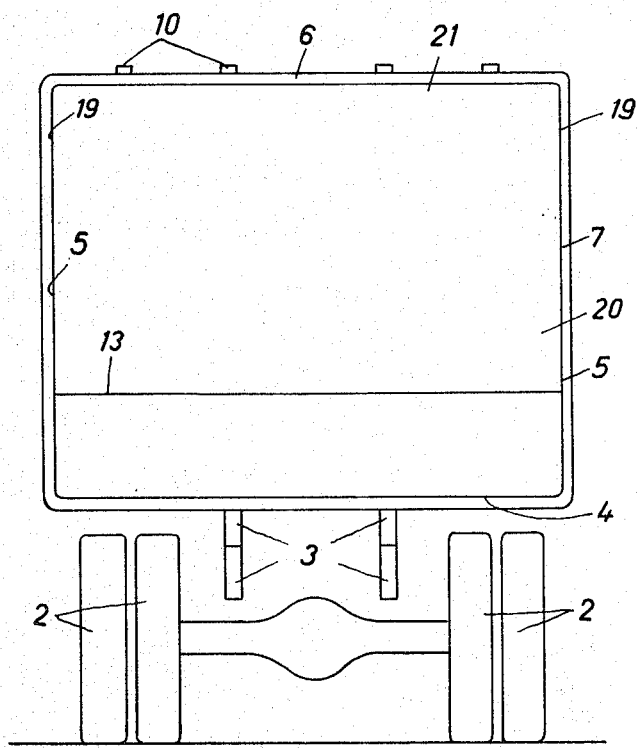
FIG. 2 is a rear elevation of the same as above.

The rear wall of the rubbish tank has to be opened. Therefore the rear of the rubbish tank is provided with a so-called swingable rear section, which viewed from the side in FIG. 1 presents a broken line obtained by connecting the points 10, 11, 12, 13, 14 and 15. This swingable rear section can be turned on hinges 10 fixed to the roof by means of a hydraulic mechanism not shown in the drawings. Turning thus takes place around the mathematical axis running perpendicularly to the plane of FIG. 1 through the point 10, at which the swingable rear section at other points is being detached from the rubbish tank itself along planes running through the lines 10, 11 and 12 perpendicularly to the plane of the figure. Thus the rear of the rubbish tank is opened and the rubbish compressed into the tank can be discharged through the open rear by pushing the beforementioned front wall, moving in the manner of a piston, towards the rear. The swingable rear section when in the lowered position indicated in FIGS. 1 and 2 can be locked to this position by means of locking devices not shown in the drawing.

In the lowered position the side walls 16 of the swingable rear section are extensions in the same plane to the side walls 5 of the rubbish tank and, correspondingly, the plate 6 forming the roof of the swingable rear section is an extension in the same plane to the plate 6 forming the roof of the rubbish tank. The bottom plate 18 of the swingable rear section, which is bending uniformly in rearwardly and upwardly direction to point 13, is an extension to the bottom plate 4 of the rubbish tank.

In FIG. 1 the part bounded by the broken line between the points 13, 14 and 15, the so-called dipper, is able to swing rearwardly and downwardly about the axis running through the point 13 perpendicularly to the plane of FIG. 1. At the point 13 hinges are provided for the purpose which are not presented in the drawing. The dipper 19 can thus be swung to the position 19 as indicated by dotted lines in FIG. 1 by means of hydraulic power devices not shown in the drawing. Other hydraulic power means may also be connected to the dipper, by means of which its position if height can be altered from the position 19a shown in the figure, e.g. to the lower position 19b, at which the lower part of the dipper is touching the ground. The side walls 19 of the dipper are extensions to the side walls 16 of the swingable rear section when the dipper is in raised position 19. In addition to the side walls 19 the dipper has a rear wall 20 and a bottom 21. Otherwise it is open so that it can be loaded with rubbish when in position 19a or 19b, or e.g. separate waste containers can be placed on its bottom 21 and tied to the dipper in one way or another. When the dipper then is swung from position 19a to the position 19 the rubbish drops out from the dipper, or from the open waste containers attached to it, into the swingable rear section of the rubbish tank, to its bottom 18.

The swingable rear section of the rubbish tank has a front wall connected thereto. It consists of a plate arranged perpendicularly to the plane of FIG. 1 connected to the side walls 16 and extending from the front edge 10 of the plate 17 as a plane surface down to the point 11, making at this point a slight bend and continuing as a plane surface towards the front edge 12 of the bottom 18 of the swingable rear section. This front wall, however, does not reach the bottom plate 18 at all points, so that an opening of a suitable size is remaining between the swingable rear section and the main rubbish tank, through which opening rubbish can be pushed swingably from the rear section into the main rubbish tank by means of devices adapted for the purpose.

When the rubbish tank has become filled with crushed and compactly compressed rubbish, and this cargo has been driven to the dumping ground, it is only necessary to raise the swingable rear section of the motor vehicle on the hinges 10 by means of the hydraulic power means, at which the rear end of the rubbish tank opens and the rubbish can be pushed out from the tank by forcing the inner second front wall of the rubbish tank backwards inside of the tank in the manner of a piston.

The mobile front wall consists of a plate-like wall construction 30 made of plate iron, the lower part of which is making a small bend at the line 31 (FIGS. 3, 5 and 6) so that the plate-like part 32 underneath is less inclined forwardly than the upper part. The front wall is supported from the rear by U-shaped bars 33. The upper part of the front wall is bent to form a plate-like horizontal part 34 which then continues some distance in the downward direction to form a flange 35. Plate-like parts 34a, running in the same direction as the side walls of the waste container and narrowing off vertically, are joined to the side edges of the front wall, while that edge of part 34a which is farther to the rear of the front wall 30 is bent towards the centre of the waste container to form a flange 36 (FIG. 3). Down below the beforementioned part 34a is narrowing off in the downward direction at point 37. The side edges of the front wall 30 and the plate-like parts 34a, running in the same direction as the side walls of the waste container, are provided below with a groove 38 (FIGS. 3 and 5) with rectangular cross-section and open towards the side. The groove 38 is limited from above by a flange 39, and from below by flange 40. FIG. 3 shows a complete view only of that part of the front wall which is situated to the right of the centre line of the wall. The part on the left is symmetrical to the part on the right, so that the left part also is provided with a notch corresponding to the groove 38. U-shaped bars 43 (FIG. 9) running in the direction of the bottom of the waste container are rigidly connected to the inner surface 42 of the side walls of the waste container with the open side down at points corresponding to the groove 38. In these U-shaped bars pins 44 are attached cross-wise in a row at regular intervals along the entire length of the U-shaped bar.

The parts of the front wall running parallel with the side walls of the waste container are provided with axle studs 45 with rollers 46 (FIGS. 7 and 8), the lower parts of which are reaching through corresponding holes in the flange 39, so that the rollers 46 are contacting the horizontal upper surface of the U-shaped bar 43 along which they are able to roll, thus supporting the mobile front wall 30. The front wall is provided below the U-shaped bar with an axle 48 (FIG. 9) rotating in a bearing 47, which axle in turn is provided at its extreme ends with cogwheels 49, the cogs of which are fitting between the pins 44, so that the rotating cogwheels 49 are able to move the front wall 30 back and forth inside of the waste container.

The axle 48 rigidly connected to the cogwheels 49 is rotated by means of a hydraulic motor M using a pressure medium compressed by the motor of the vehicle, which liquid subjected to pressure is conducted to the hydraulic motor, and from the motor, by means of flexible tubes T' and T" communicating with a compressor connected to the motor of the vehicle, the flexible tubes mentioned being coiled with sufficient allowance to permit the hydraulic motor mounted to the mobile front wall to move along both ways in the direction of the motor vehicle between the extreme positions, one in which the mobile front wall is fast to the stationary front wall closing the front end of the waste container, or close to it, the other the position in which the mobile front wall is situated at the rear end of the bottom of the waste container.

In order to discharge the load it is thus not necessary to tip the platform of the vehicle, including the waste container, in that the latter can be discharged by pushing the mobile front wall towards the rear.

Except with waste the tank or corresponding container can also be loaded, for instance, with sand which is pushed towards the rear by means of the mobile front wall, at which the platform or the container may be provided at the rear end with additional feeding devices for feeding sand on the road, e.g. for sanding frozen snow-covered roads in winter time. Thus the sand may conveniently be moved from the front part of the container to its rear close to the feeding devices, so that these are able to function continuously without tipping the platform. Naturally, it is also possible to feed sand on the road from the rear of the vehicle by means of the mobile front wall without the feeding devices mentioned. Instead of a container which is closed at the top a box-like platform open at the top may be used for spreading sand, and also the mobile front wall exclusively without a stationary front wall or without a second, mobile, front wall. The device according to the invention can also be used, for instance, for spreading road salt, for sowing fertilizer on the field etc., at which the platform or the container, including mobile front walls, may be constructed on a separate trailer drawn by a tractor.

As the front wall 30 is forwardly inclined in the way indicated in the FIGS. 5 and 6 the hydraulic motor may be placed behind it between the wall 30 and the plane going through the edges 50, at which the front wall 30 can be moved so near the stationary front wall of the waste container that the edges 50 contact the stationary wall. The hydraulic motor is not shown in the drawing. This can be of any type known as such. The axle 48 may thus be rotated by means of transmission between the cogwheel on the axle mentioned and a cogwheel on the shaft of the hydraulic motor over a chain, or the hydraulic motor may be built in such a way that the axle 48 also is the shaft of the hydraulic motor from which it is receiving its power.

The front wall can be provided with an opening 49, according to FIG. 3, the cover of which is opened in order to reach the hydraulic motor through the front wall.

The invention is not restricted only to the above described working example, but it can be varied in many ways within the scope of the patent claims following.

I claim:
1. A movable front wall within the waste container of a transport vehicle, adapted to discharge and if necessary to compress the contents of the container, said front wall having mounted thereon a transverse shaft driven by a hydraulic motor and provided at the ends thereof with cogwheels each engaging a track arranged inside of a U-shaped channel attached with open side down to each side wall of the container, with the upper sides of the U-shaped channels serving to support the movable front wall, means for conducting pressure fluid to the hydraulic motor through flexible tubing from a pump located outside of the container, said movable front wall consisting of a case-like construction comprising a plate contacting the contents of the container and inclined rearwardly from above, side plates and wheels mounted on journals spaced at a distance from each other in the longitudinal direction on the lower part of each side plate, which wheels are adapted to roll along the upper surface of the U-shaped channels attached to the lower part of the side plates of the container, thus supporting the movable front wall so it may move from one end of the container to the other end.

2. A front wall as in claim 1, characterized in that it possesses a horizontal groove opening outwardly in each side plate of the front wall, through which grooves said U-shaped channels run and longitudinal openings provided in the upper surface of said grooves, through which openings said wheels are in contact with the upper surface of said U-shaped channels.

References Cited by the Examiner
UNITED STATES PATENTS
3,212,657  10/1965  Murfitt et al. _____ 214—82

OTHER REFERENCES
German printed application 1,149,301, 5/1963.

GERALD M. FORLENZA, *Primary Examiner.*
ROBERT G. SHERIDAN, *Examiner.*